United States Patent Office.

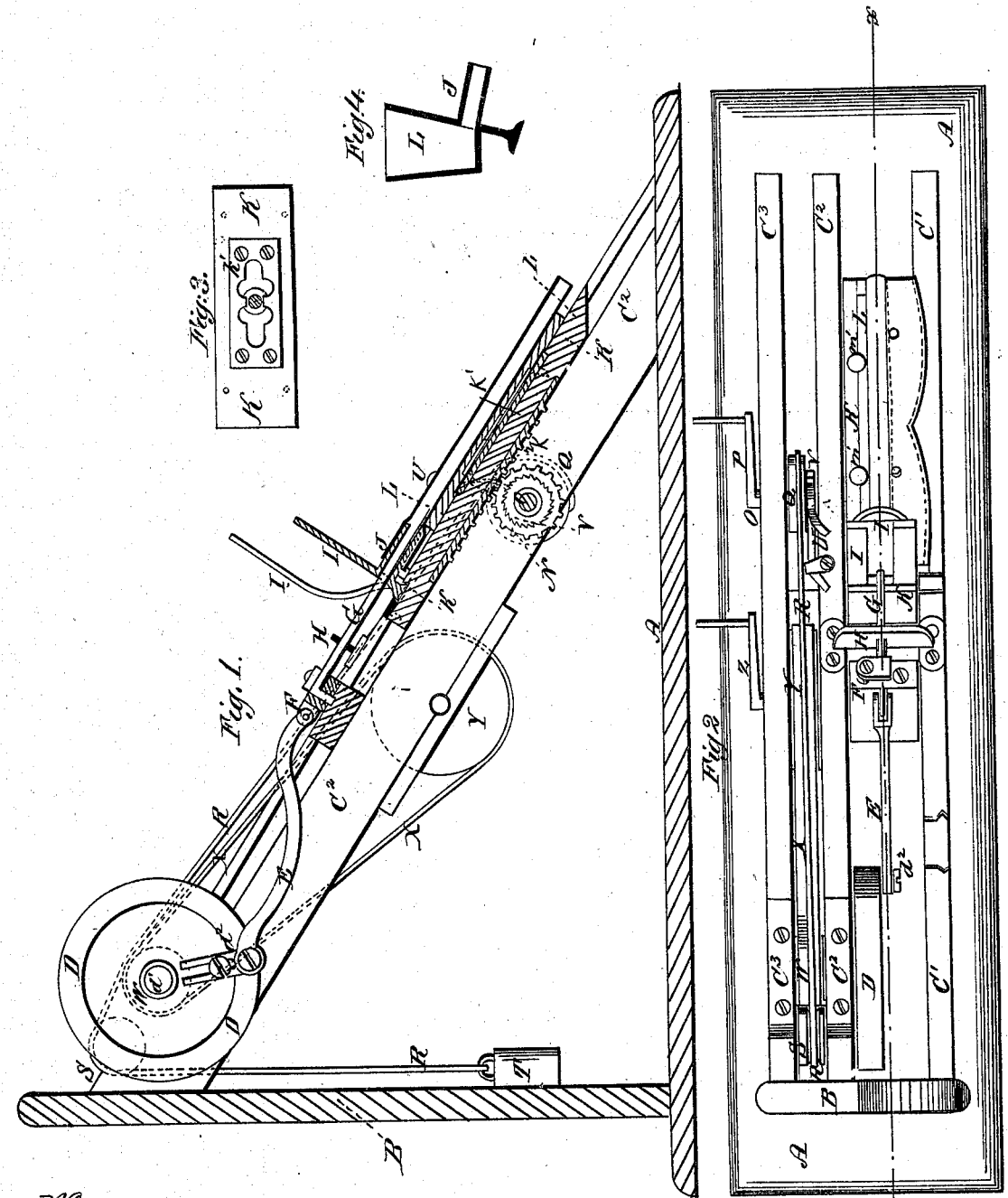

GEORGE W. HOBART, OF SILVERTON, OREGON.

Letters Patent No. 90,170, dated May 18, 1869.

---

IMPROVED MACHINE FOR STUFFING HORSE-COLLARS.

---

The Schedule referred to in these Letters Patent and making part of the same.

---

*To all whom it may concern:*

Be it known that I, GEORGE W. HOBART, of Silverton, in the county of Marion, and State of Oregon, have invented a new and improved Machine for Filling Horse-Collars; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved machine, taken through the line $x\ x$, fig. 2.

Figure 2 is a top or plan view of the same.

Figure 3 is a detail sectional view, showing the manner in which the collar-board is pivoted to the slide.

Figure 4 is a detail sectional view of the hopper for filling cut, or fine stuffing.

Similar letters of reference indicate corresponding parts.

My invention has for its object to furnish a simple, convenient, and effective machine for filling, or stuffing the rims and balls of horse-collars, by means of which the work may be done easily, quickly, and well; and It consists in the construction and combination of the various parts of the machine, as hereinafter more fully described.

A is the base-plate, or frame of the machine, to the rear part of which is securely attached the lower end of the vertical board, or frame B.

$C^1\ C^2\ C^3$ are three inclined parallel bars, or beams, the upper ends of which are securely attached to the upper part of the vertical board, or frame B, and the lower ends of which are securely attached to the forward part of the base-plate, or frame A.

D is a crank-wheel, the shaft $d^1$ of which works in bearings in the upper parts of the inclined bars $C^1$, and which is made heavy, so as to serve as a fly, or balance-wheel.

The crank-pin $d^2$ of the wheel D is adjustably secured to the said wheel by a screw, as shown in fig. 1, so that it may be adjusted nearer to or further from the centre of said wheel D, according to the desired throw of the stuffing-rod.

E is a pitman, the upper end of which is pivoted to the crank-pin $d^2$ of the wheel D, and the lower end of which is pivoted to the sliding block, or cross-head F.

Upon the ends of the sliding block, or cross-head F are formed tongues, which enter longitudinal grooves formed in the adjacent sides of the two inclined bars $C^1$ and $C^2$.

G is the stuffing, or filling-rod, the upper end of which is bent at right angles, so as to enter a hole formed for its reception in the upper side of the cross-head, or sliding block F, where it is detachably secured in place by a button pivoted to said cross-head, or by other convenient means. The lower end of the rod G is flattened, and has a short fork formed in it, as shown in fig. 1. The rod, thus constructed, is designed for use in filling, or stuffing a collar with long straw. When cut, or short material is to be used, the lower end of the said stuffing-rod should be made blunt, and without the fork.

H is a guide-plate, attached to the beams, or bars $C^1\ C^2$, in a position at right angles with the rod G, and having a hole formed in it for the passage of the said rod G.

I is the feed-rack, which is open at the top and ends, and the rear side of which is slotted for the free passage of the stuffing-rod G.

To the lower part of the forward side of the rack I, is attached a short tube, J, leading into the interior of said rack, which is designed to enter the collar to be stuffed, and through which the rod G passes, forcing the material through the said tube into the said collar.

The base of the feed-rack I is made flanged, or dovetailed, as shown in fig. 1, and is inserted in place and removed therefrom through a dovetailed notch in the beam, or bar $C^1$, into a dovetailed notch in the slide K, so as to be carried up and down with and by the said slide K.

When cut, or fine material is to be used for stuffing the collar, the feed-rack I is removed, and replaced with the feed-hopper L, which is open at the top, and the sides of which are close, except a hole in the lower parts of its rear and front sides, for the passage of the stuffing-rod.

The hopper L is provided with a small tube, J, in the same manner, and for the same purpose, as before described with reference to the tube J of the feed-rack I.

K is a board, or plate, sliding in the longitudinal slots in the beams $C^1\ C^2$, and carrying with it the feed-rack, or hopper, as hereinafter described.

$k^1$ is a plate, let into a recess in the upper side of the board, or slide K. The plate $k^1$ is slotted longitudinally, as shown in fig. 3, which slot is made with two or more recesses upon each side to receive the pivot of the collar-board M, so that the position of said collar-board may be adjusted in various positions, as required.

M is the collar-board, to which the collar to be stuffed is attached by nails, as shown in fig. 2, or by other convenient detachable means. The collar-board M is made smaller than the slide K, and is secured in place, when adjusted in proper position, by the pins $m$, or equivalent, inserted in holes in the slide K, close to the one or the other edge of the collar-board M, according to the position in which said collar-board has been adjusted. This construction allows the collar-board M to be turned end for end, moved up or down, or to one or the other side of the slide K, and secured in place without its being necessary to detach the collar or change its position upon said board.

To the under side of the slide K is attached a toothed rack, $k^2$, into the teeth of which mesh the teeth of the gear-wheel N, attached to the shaft O, which works in bearings in the beams, or bars $C^1$ $C^2$ $C^3$, and to one end of which is attached the crank P, by means of which the slide K is moved up and down.

To the shaft O is attached a pulley, Q, to which is attached the end of the rope, or chain R, which passes around said pulley Q, over a pulley, S, pivoted to the upper part of the machine; and to the other end of said rope, or chain is attached a weight, T, the size of which should be regulated by the closeness with which it is desired to have the stuffing packed, the weight T holding the slide K up against the stuffing-rod G with a force proportional to the size of said weight.

The slide K is kept from being drawn up by the weight T by the pawl U, attached to one of the beams $C^1$, and the engaging-end of which engages with the teeth of the ratchet-wheel V, attached to or connected with the shaft O.

To the shaft $d^1$ of the crank-wheel D is attached a pulley, W.

X is a belt, which passes around the pulley W, and around the pulley Y, the shaft of which revolves in bearings in the bars, or beams $C^2$ $C^3$, and to one of its ends is attached the crank Z, by means of which the machine is operated.

When the machine is to be operated by other than hand-power, the crank Z and pulley Y may be omitted, and the power applied directly to the shaft $d^1$.

Having thus described my invention,

I claim as new, and desire to secure by Letters Patent—

1. The combination of the crank-wheel D, adjustable crank-pin $d^2$, pitman E, sliding block, or cross-head F, stuffing-rod G, feed-rack I and hopper L, either or both, tube J, slide K, and adjustable collar-board M, with each other and with the frame A B, $C^1$ $C^2$ $C^3$, substantially as herein shown and described, and for the purpose set forth.

2. Adjustably pivoting the collar-board M to the slide K by means of the slotted and recessed plate $k^1$, substantially as herein shown and described, and for the purposes set forth.

3. The combination of the rack $k^2$, gear-wheel N, shaft O, rack V, pawl U, crank P, pulley Q, rope or chain R, and weight T, with each other and with the slide K, and beams, or bars $C^1$ $C^2$ $C^3$, substantially as herein shown and described, and for the purposes set forth.

GEORGE W. HOBART.

Witnesses:
WILLIS DUNAGAN,
WM. W. SAUNDERS.